UNITED STATES PATENT OFFICE.

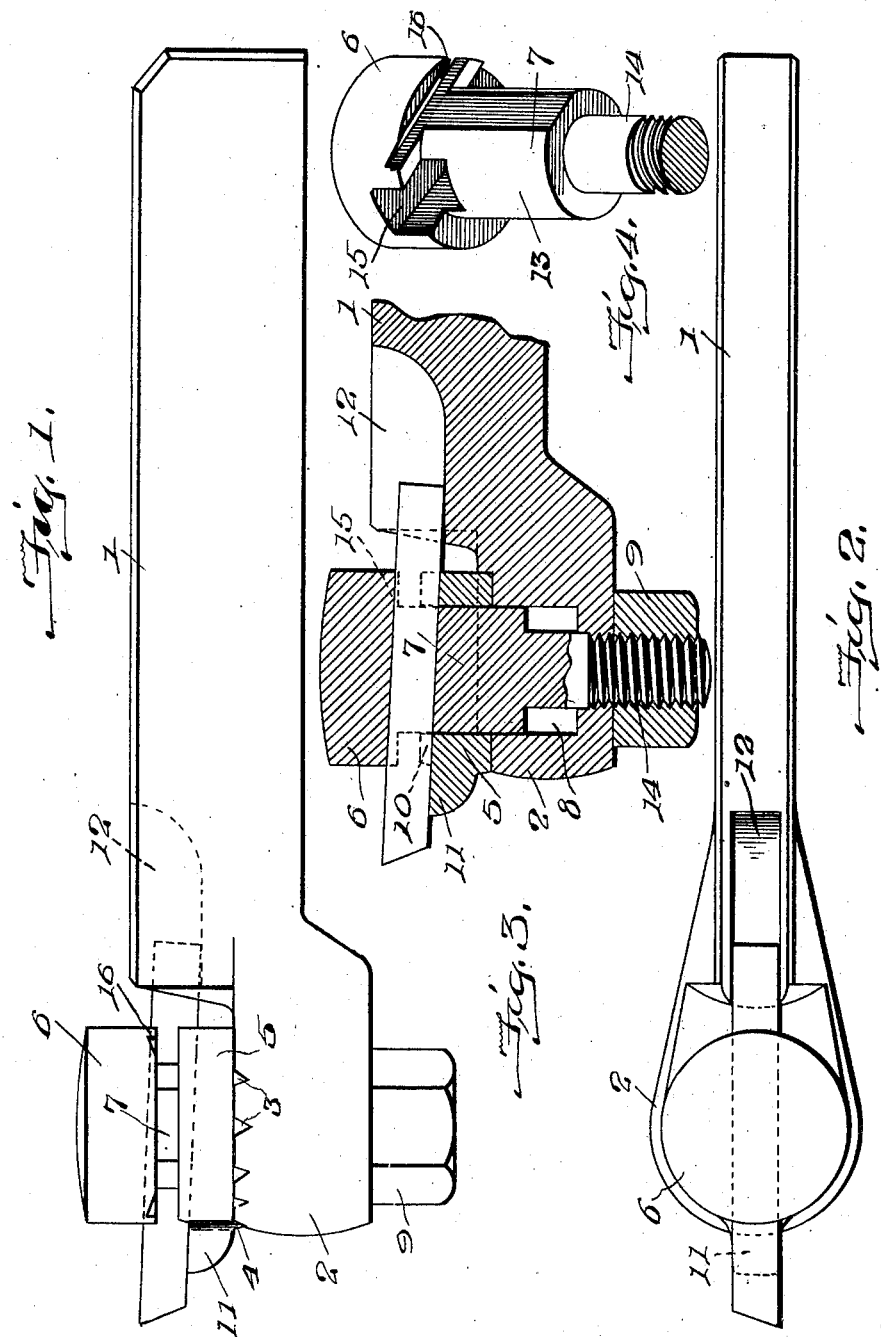

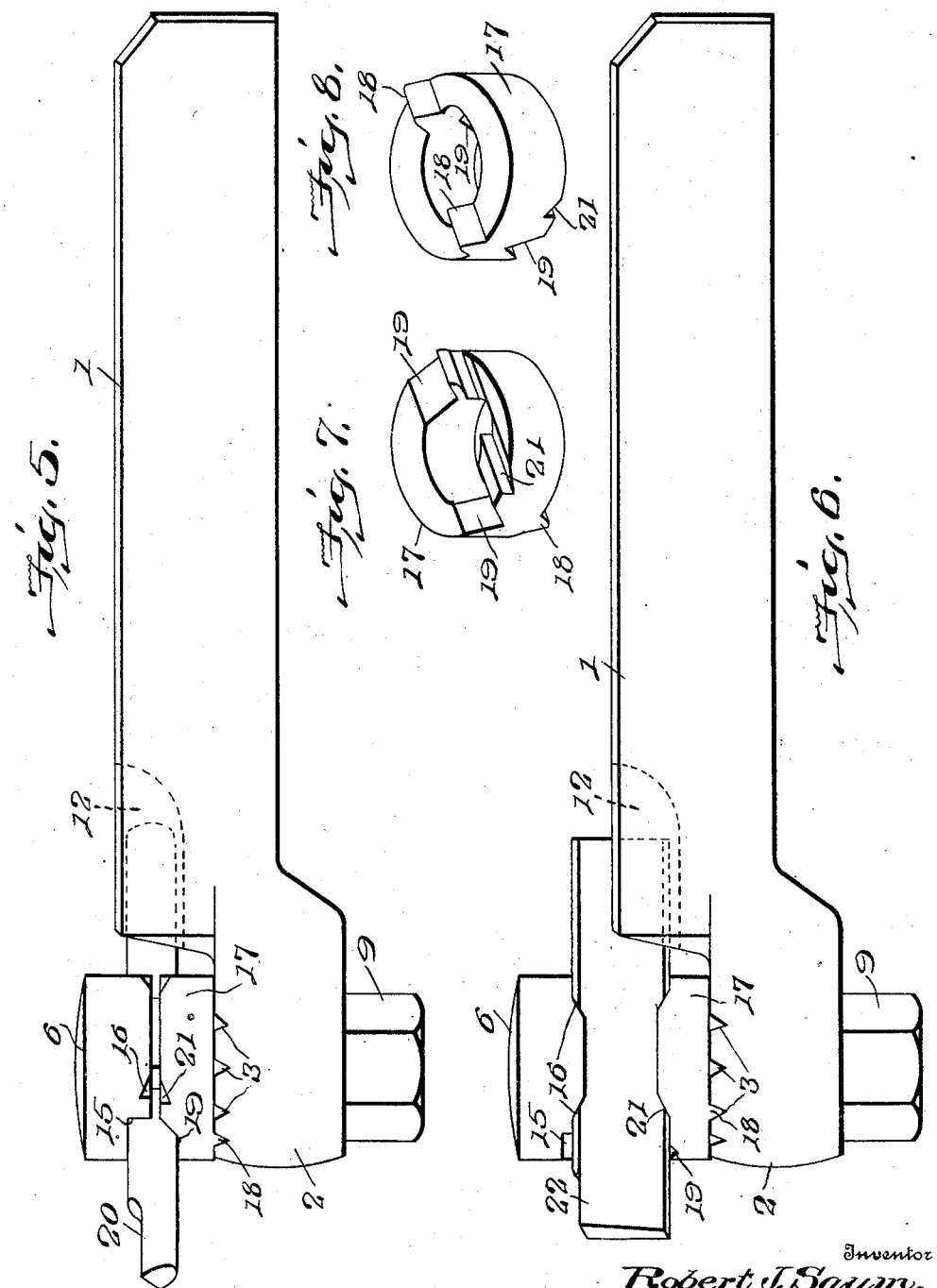

ROBERT J. SAUM, OF SPRINGFIELD, OHIO, ASSIGNOR TO THE WESTERN TOOL AND MANUFACTURING COMPANY, OF SPRINGFIELD, OHIO, A CORPORATION OF OHIO.

TOOL-HOLDER.

983,461.

Specification of Letters Patent.   Patented Feb. 7, 1911.

Application filed August 10, 1907.   Serial No. 387,981.

*To all whom it may concern:*

Be it known that I, ROBERT J. SAUM, a citizen of the United States, residing at Springfield, in the county of Clark and State of Ohio, have invented certain new and useful Improvements in Tool-Holders, of which the following is a specification, reference being had therein to the accompanying drawings.

This invention relates to tool holders, and the object of the invention is to provide a tool holder in which the head is dropped to a lower level than that occupied by the shank, thereby bringing the tool into alinement with the shank; and to provide such a tool holder which will be adapted to hold any one of a large variety of tools, thus enabling one holder to take the place of several as at present constructed.

With these objects in view my invention consists in certain novel features of construction and in certain parts and combinations hereinafter to be described, and then more fully pointed out in the claims.

In the accompanying drawings, Figure 1 is a side elevation of my invention equipped with a planer tool; Fig. 2 is a top plan view of the same; Fig. 3 is a longitudinal sectional view, taken vertically through the head; Fig. 4 is a detail view of the clamping bolt; Fig. 5 is a side elevation of my invention equipped with a boring tool; Fig. 6 is a side elevation of the invention equipped with a cutting off tool; Fig. 7 is a detail view of a clamping collar; and Fig. 8 is a detail view of the clamping collar inverted.

In these drawings, I have illustrated the preferred form of my invention and have shown the same as comprising a body portion having a shank 1 adapted to be engaged by a support or tool holder and having at its forward end an enlarged head 2, which is preferably dropped or depressed so that its upper and lower surfaces lie in lower planes than the upper and lower surfaces of the shank 1, thus locating the head on a lower level than that occupied by the shank 1. The head 2 is preferably provided on its upper surface with a plurality of notches or recesses 3 adapted to receive a projection 4 formed on the lower surface of a clamping collar 5, which is of a diameter substantially equal to that of the head 2 and is adapted to be supported on the upper surface thereof, the projection 4 and notches 3 serving to prevent rotation of the collar 5 after the same has once been adjusted. This collar is provided with one or more transverse recesses or notches adapted to coöperate with one or more corresponding notches or recesses formed in the lower surface of the head 6 of the clamping bolt 7 which extends through the aperture 8 in the head 2 and is engaged beneath said head by a suitable nut 9.

In the form of the device shown in Figs. 1 to 3, the holder is equipped with a specially constructed clamping collar for use with a planer tool and this collar, while corresponding in its general aspect to the ordinary collar, has a single notch 10 extending transversely of the collar and through the center thereof. The bottom of this notch is preferably flat to correspond to the shape of the ordinary planer tool. The collar is also provided on one side thereof, and adjacent to one end of the notch 10, with a projection or lip 11 adapted to extend beneath the planer tool and form a support therefor. The shank 1 is cut away to provide a longitudinal recess 12 in its forward end adjacent to the head 2. This recess 12 is adapted to receive the rearwardly projecting end of the tool and, engaging the opposite sides of the same, prevent any lateral motion thereof, and further permits the tool to be dropped down below the level of the upper surface of the shank 1, thus bringing the tool into alinement with the shank 1 and to a position near the center of the work. The clamping bolt 7 consists of an enlarged body portion 13 adapted to enter the enlarged upper portion of the aperture 8 in the head 2 and the reduced lower portion 14, having its lower end screw-threaded, as shown, and adapted to receive the nut 9. The head 6 of the bolt 7 is preferably of a diameter substantially equal to that of the collar 5 and head 2. In the form here shown, the bolt is provided with a transverse aperture 15 extending centrally through the same, located partially in the head 6 and partially in the enlarged body portion 13 and is preferably rectangular in cross section, as shown. The head 6 of the bolt 7 is also provided with a transverse notch or recess 16 formed in the lower surface of the head and extending parallel with the aperture 15 and preferably having its inner wall vertical and its outer wall inclined thereto, as shown.

When used with a planer tool the holder is assembled as shown in Fig. 3, with the tool extending through the aperture 15 in the clamping bolt and engaging on each side of the clamping bolt with the walls of the recess 10 in the clamping collar 5. The tool is adjusted to project the forward end thereof a proper distance beyond the head 2 and the nut 9 is then tightened down and the tool clamped firmly in position.

When it is desired to employ the holder in connection with tools other than planer tools, or tools similar thereto, a collar 17, differing in some respects from the collar 5, is substituted for the collar 5. The collar 17 is also provided on its lower surface with projections 18, corresponding to the projections 4 on the collar 5, and is provided in its upper surface with a central notch or recess 19, extending transversely thereof near the center and preferably V-shaped in cross section and adapted to coöperate with the aperture 15 in the clamping bolt 7. The inclined walls of the recess 19 enable the same to grip firmly and hold securely in position tools of various shapes, such as the boring tool 20 shown in Fig. 5. The collar is also provided with a notch 21, extending parallel to the notch 19, and preferably having its inner wall vertical and its outer wall inclined thereto and adapted to coöperate with the notch 16 in the lower surface of the head 6 of the clamping bolt to hold the thin flat tools, such as the cutting off tool shown at 22 in Fig. 6. These tools usually have their opposite edges beveled and these beveled edges are firmly gripped by the inclined walls of the recesses 16 and 21 and the tool securely clamped in position. The series of notches 3 formed in the head 2 enables the collar 17 and clamping bolt 7 to be rotated to adjust the tool to the desired angle relatively to the shank 1 and to the work and then locked in their adjusted position.

Thus it will be seen that I have provided a tool holder of this character which is adapted to receive and securely hold any one of a large variety of tools for, while I have shown the holder as equipped with but three different tools, it is obvious that a great many other tools could be held therein; further, that I have provided such a tool holder with the head depressed or dropped to a lower level than the level of the shank, thus bringing the tool into alinement with the same and lowering the same relatively to the work; and that, by providing the shank with the longitudinal recess, I not only am enabled to drop the tool beneath the level of the upper surface of the shank, but also to prevent the lateral movement of the tool by the engagement therewith of the side walls of the recess.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. A tool holder comprising a shank and a downwardly offset head having a vertically arranged bolt passage and provided in its upper face with a series of recesses, said shank having a longitudinal recess in that portion thereof lying adjacent to and in a plane above said head, a tool-supporting collar seated on the upper side of said head and having its tool-supporting surface in a plane lower than the plane of the upper surface of the recessed portion of said shank, a projection carried by said collar and adapted to engage one of the recesses in said head, a clamping bolt extending through the bolt passage in said head and through said collar and having an enlarged head adapted to engage the tool supported thereby, and a nut screwed onto said bolt beneath said head, whereby said tool is clamped to and supported by said head in the same plane with said shank.

2. A tool holder comprising a shank and a downwardly offset head having a vertically arranged bolt passage and provided in its upper face with a series of recesses, said shank having a longitudinal recess in that portion thereof lying adjacent to and in a plane above said head, a tool-supporting collar seated upon the upper side of said head and having its tool supporting surface in a plane lower than the plane of the upper surface of the recessed portion of said shank and having in its upper surface a plurality of tool-supporting seats, a projection carried by said collar and adapted to engage one of the recesses in said head, a clamping bolt extending through the bolt passage in said head and through said collar and having an enlarged head provided with a plurality of tool-engaging recesses to coöperate with the seats in said collar to secure the tool to said head, and a nut screwed onto said bolt beneath said head, whereby said tool is clamped to and supported by said head in the same plane with said head.

In testimony whereof, I affix my signature in presence of two witnesses.

ROBERT J. SAUM.

Witnesses:
A. C. LINK,
EDWARD S. REED.